(12) United States Patent
Nguyen et al.

(10) Patent No.: US 8,687,679 B2
(45) Date of Patent: Apr. 1, 2014

(54) DATALINK SYSTEM ARCHITECTURE USING OTS/COTS MODEM FOR MIMO MULTIPATH SENSING NETWORKS

(75) Inventors: Tien M. Nguyen, Yorba Linda, CA (US); James C. Thi, Newport Beach, CA (US)

(73) Assignee: Raytheon Company, Waltham, MA (US)

( * ) Notice: Subject to any disclaimer, the term of this patent is extended or adjusted under 35 U.S.C. 154(b) by 680 days.

(21) Appl. No.: 12/940,812

(22) Filed: Nov. 5, 2010

(65) Prior Publication Data

US 2012/0114026 A1    May 10, 2012

(51) Int. Cl.
*H04B 1/38*    (2006.01)
*H04L 5/16*    (2006.01)

(52) U.S. Cl.
USPC .......................... 375/220; 375/340; 375/222

(58) Field of Classification Search
USPC ......................................... 375/220, 340, 222
See application file for complete search history.

(56) References Cited

U.S. PATENT DOCUMENTS

2003/0193430 A1*   10/2003   Gresham et al. ................ 342/70

OTHER PUBLICATIONS

Tien Nguyen; Mark Hammond; Joel McWilliams; "R-CDL Communication Closes the NT-ISR Information Gap," Raytheon Technology Today, 2007, Issue 4, pp. 39-41.*
Bo Liu ; Chunlin Han ; Benyong Liu; "Receiving Signal Processing of Wideband MIMO Radar Based on Transmitting Diversity," International Conference on Radar, 2006, CIE '06, pp. 1-4.*
Tien M. Nguyen, et al., "R-CDL Communication Closes the NT-SIR Information Gap," Technology Today Magazine, Raytheon, 2007, Issue No. 4 (5 pgs.).
Geoffrey Gibbons, et al., "Communications and Network Modeling and Simulation for Tactical Multi Function RF Systems", Raytheon MFRF Systems Symposium, Anaheim, Oct. 13-Oct. 13, 2009 (1 pg.).

* cited by examiner

*Primary Examiner* — Shuwang Liu
*Assistant Examiner* — Nader Bolourchi
(74) *Attorney, Agent, or Firm* — Christie, Parker & Hale, LLP

(57) ABSTRACT

An apparatus interfaces a commercial-off-the-shelf (COTS)/off-the-shelf (OTS) modem for pulsed data communication using existing sensor aperture among radar platforms. The apparatus includes a demodulator for receiving a sequence of first pulse signals, at least one first pulse signal of the sequence of first pulse signals being modulated with an input signal. The demodulator includes a pulse regeneration module for regenerating a pulse timing of the sequence of first pulse signals and a pulse demodulation module for demodulating the sequence of first pulse signals to recover the input signal in synchronization with the pulse timing of the sequence of first pulse signals.

12 Claims, 12 Drawing Sheets

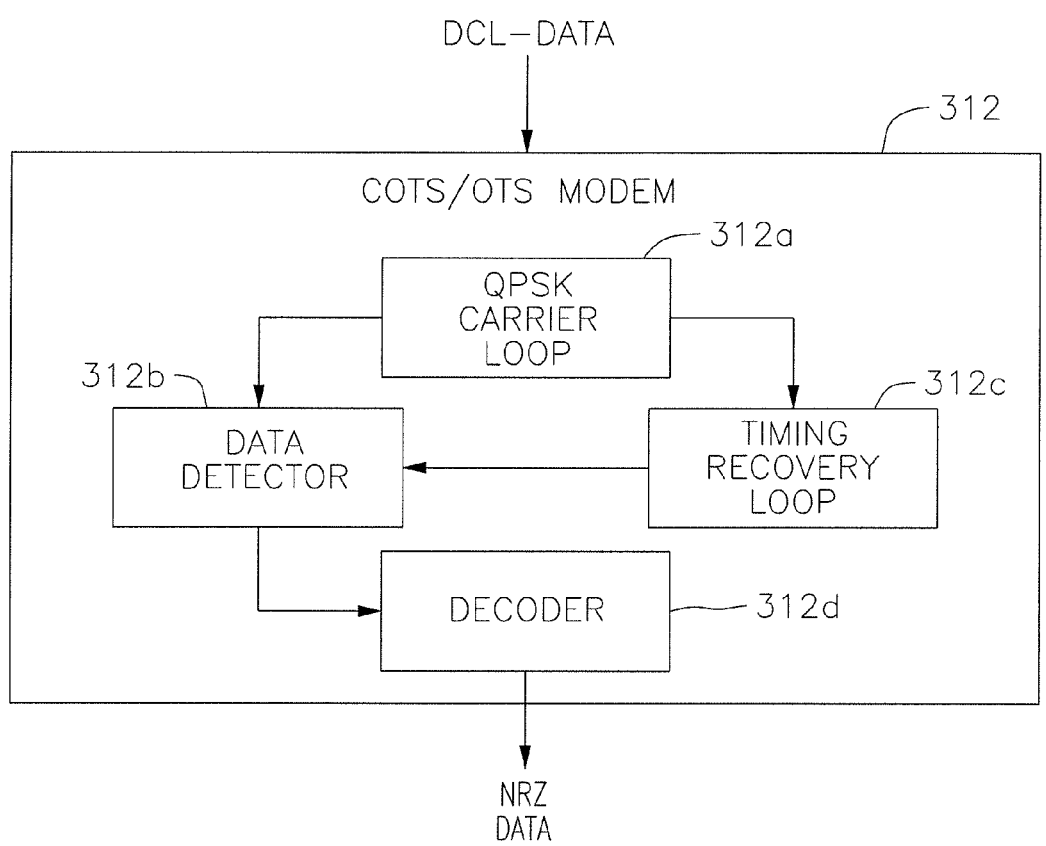

DATALINK SYSTEM ARCHITECTURE USING OTS/COTS MODEM FOR MIMO MULTIPATH SENSING NETWORKS

BACKGROUND

1. Field

Aspects of one or more embodiments of the present invention are directed toward data communication using an existing radar aperture, and, in particular, pulsed data communication between radar platforms.

2. Description of Related Art

A radar system uses electromagnetic waves to identify fixed or moving objects such as aircrafts, ships, motor vehicles, and terrain, etc. A typical radar system has a transmitter that emits a radio wave that is partly reflected back by an object, and the reflected signal has a slight change of wavelength (or frequency) if the target is moving. The radar system also has a receiver for receiving the reflected signal. The transmitter and receiver may be located at the same physical location or different locations. The radar system may include one or more transmitters and/or one or more receivers.

A multiple input multiple output (MIMO) radar system includes a plurality of transmitters for transmitting RF signals to illuminate one or more targets and a plurality of receivers for receiving backscattered RF signals from the one or more targets. In the MIMO radar system, the transmitters and receivers may be located on a plurality of platforms physically distanced from each other. Each of the platforms may include one or more transmitters and/or one or more receivers, and the platforms may be stationary (e.g., a ground based radar station) or mobile (e.g., an aircraft or motor vehicle). In addition to performing radar sensing functions, the transmitters and receivers of the MIMO radar system can be utilized for providing a high-speed data link among the platforms constituting the MIMO radar system. That is, using the radar's antennas (or apertures) concurrently for radar sensing and transmitting/receiving high-speed data, a large amount of data (e.g., radar sensing data) may be shared among the platforms. In a MIMO radar system that performs sensing in pulsed mode, communication data may be sent between radar scans as pulsed communication signals such as Radar Common Data Link (R-CDL) or Pulsed Common Data Link (P-CDL) waveforms. In addition, each platform includes a suitable modem for converting (e.g., modulating) digital communication data to analog signals to be transmitted by its antenna or converting (e.g., demodulating) analog signals received from its antenna to digital communication data. Therefore, it is desirable that the modem can handle P-CDL waveforms. While commercial-off-the-shelf (COTS) or off-the-shelf (OTS) modems are widely available, such modems are typically not capable of modulating/demodulating R-CDL or P-CDL waveforms directly. It is known that an R-CDL modem has been developed by L3 Communications Corporation to handle P-CDL waveforms by employing coherent demodulation using preamble/postamble detection. It is desirable to provide a solution to utilize standard COTS or OTS modems to handle P-CDL waveforms.

SUMMARY

Aspects of one or more embodiments of the present invention are directed toward a novel way to employ existing plug-and-play CDL modems such as generally available standard COTS/OTS CDL modems for radar communications in an MIMO sensing environment using an existing radar aperture.

According to exemplary embodiments of the present invention, a sensor and communication interface is provided to interface a standard COTS/OTS modem with a sensor receiver/transmitter of a radar system. Functions of the sensor and communication interface include modulating a standard CDL waveform onto the sensor pulses as P-CDL waveforms and recovering the CDL waveform modulated onto the sensor pulses. The sensor and communication interface may utilize an on-off switch controlled by a sensor clock to modulate the CDL waveform onto the sensor pulses. Also, the sensor and communication interface employs novel approaches to demodulate the P-CDL waveforms to re-generate the sensor pulses and include an option for compensating the Doppler effect in highly dynamic MIMO platform.

According to an embodiment of the present invention, an apparatus for interfacing a modem to pulsed data communication includes a demodulator for receiving a sequence of first pulse signals, at least one first pulse signal of the sequence of first pulse signals being modulated with an input signal. The demodulator includes a pulse regeneration module for recovering a pulse timing of the sequence of first pulse signals and a pulse demodulation module for demodulating the sequence of first pulse signals to recover the input signal in synchronization with the pulse timing of the sequence of first pulse signals.

The apparatus may further include a pulse modulator for receiving an output signal from the modem, wherein the pulse modulator includes a switch for modulating the output signal onto at least one second pulse signal of a sequence of second pulse signals in accordance with a pulse timing of the sequence of second pulse signals. The input signal may be modulated onto the at least one first pulse signal by phase-shift keying utilizing at least two phase components including a first phase component and a second phase component, and the pulse regeneration module may be adapted to generate the pulse timing of the sequence of first pulse signals in accordance with a summation of an absolute value of the first phase component and an absolute value of the second phase component.

The pulse regeneration module may include a hard limiter for generating a hard-limit signal having a first value and a second value in accordance with the following conditions:

X>a reference value, the hard-limit signal is equal to the first value; and

X≤the reference value, the hard-limit signal is equal to the second value, where X is a value corresponding to the summation of the absolute value of the first phase component and the absolute value of the second phase component, and the first value is larger than the second value, and wherein a time duration when the hard-limit signal is equal to the first value corresponds to the pulse timing of the sequence of first pulse signals.

The pulse regeneration module may include a hard limiter for generating a hard-limit signal having a first value, a second value, or a third value in accordance with the following conditions:

X>$\epsilon$, the hard-limit signal is equal to the first value; and $-\epsilon \le X \le \epsilon$, the hard-limit signal is equal to the second value;

X<$-\epsilon$, the hard-limit signal is equal to the third value, where X is a value of the at least one first pulse signal, $\epsilon$ is a threshold value, the first value is larger than the third value, and the second value is between the first value and the third value; and a non-return-to-zero (NRZ) converter for converting a signal derived from an absolute value of the hard-limit signal to a non-return-to-zero data signal, wherein a time duration between two zero-crossings of the non-return-to-zero data signal corresponds to the pulse timing of the sequence of first pulse signals.

The apparatus may further include a compensator for compensating the Doppler effect of the sequence of first pulse signals.

The demodulator may be adapted to demodulate at least two first pulse signals of the sequence of first pulse signals into a first portion and a second portion of the input signal, respectively, and the apparatus may further include a buffer for combining the first portion and the second portion as the input signal.

According to an embodiment of the present invention, a method for demodulating pulsed data communication signals includes receiving a sequence of first pulse signals, at least one first pulse signal of the sequence of first pulse signals being modulated with an input signal, recovering a pulse timing of the sequence of first pulse signals, and demodulating the sequence of first pulse signals to recover the input signal in synchronization with the pulse timing of the sequence of first pulse signals.

The method may further include receiving an output signal from a modem and modulating the output signal onto at least one second pulse signal of a sequence of second pulse signals by operating a switch in accordance with a pulse timing of the sequence of second pulse signals. The input signal may be modulated onto the at least one first pulse signal by phase-shift keying utilizing at least two phase components including a first phase component and a second phase component, and the method may further include generating the pulse timing of the sequence of first pulse signals in accordance with a summation of an absolute value of the first phase component and an absolute value of the second phase component.

The method may further include compensating the Doppler effect on the sequence of first pulse signals. The method may further include demodulating at least two first pulse signals of the sequence of first pulse signals into a first portion and a second portion of the input signal, respectively, and combining the first portion and the second portion as the input signal.

According to an embodiment of the present invention, a communication system includes a sensor aperture, a sensor processor for controlling the sensor aperture and generating a sensor clock signal; a pulse CDL modulator/demodulator for demodulating a sequence of first pulse CDL signals received by the sensor aperture to generate a first CDL waveform, at least one first pulse CDL signal of the sequence of first pulse CDL signals being modulated with the first CDL waveform, and a CDL modem for demodulating the first CDL waveform. The pulse CDL modulator/demodulator includes a pulse regeneration module for regenerating a pulse timing of the sequence of first pulse CDL signals and a pulse demodulation module for demodulating the sequence of first pulse CDL signals to recover the first CDL waveform in synchronization with the pulse timing of the sequence of first pulse CDL signals.

The pulse CDL modulator/demodulator further include a pulse modulator for modulating a second CDL waveform from the CDL modem. The pulse modulator may include a switch for modulating the second CDL waveform onto at least one second pulse CDL signal of a sequence of second pulse CDL signals in accordance with sensor clock signal.

BRIEF DESCRIPTION OF THE DRAWINGS

The features and aspects of the present invention will be more apparent from the following detailed description in conjunction with the accompanying drawings, in which:

FIGS. 5A and 5B are drawings conceptually illustrating a P-CDL demodulator according to an embodiment of the present invention;

DETAILED DESCRIPTION

Figure 1:
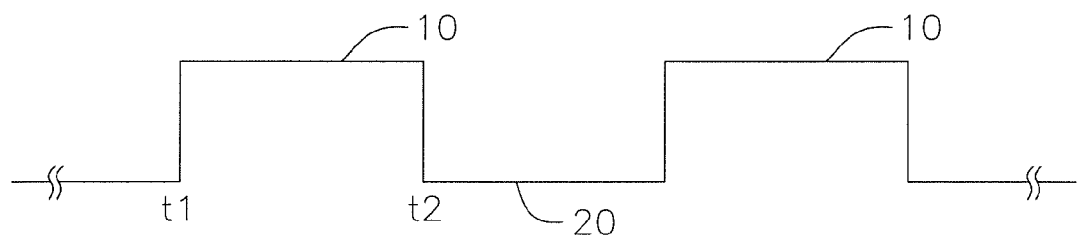
FIG. 1 is a drawing illustrating an exemplary sequence of sensor pulses.

Hereinafter, embodiments of the present invention will be described in detail with reference to the accompanying drawings. Aspects of exemplary embodiments of the present invention are directed toward a radar system or platform with the capability of utilizing a standard COTS/OTS modem interfaced with an existing sensor aperture to transmit P-CDL signals and to detect, receive and decode P-CDL signals by the standard COTS/OTS modem for application in radar systems such as MIMO multipath sensing network. In the following description, when a first element is described as being coupled or connected to a second element, the first element may be directly coupled to the second element or indirectly coupled to the second element via one or more third elements. Same elements are referred to by the same reference numeral throughout the specification.

Common Data Link (CDL) is a full-duplex, jam resistant spread spectrum, point-to-point digital link, and the uplink and downlink can operate at various bit rates. For example, the uplink may operate from 200 kbps to 45 Mbps or higher. The downlink may operate at 10.7 Mbps, 45 Mbps, 137 Mbps, or 274 Mbps, etc. However, the present invention is not limited to the bit rates expressly stated above, and other suitable bit rates may be applied in the present invention. In a multi-function radar system that utilizes a sensor aperture (e.g., radar antenna) to provide both sensing and data communication, the communication data may be modulated as P-CDL waveforms onto the sensor pulses that are transmitted/received by the sensor aperture.

FIG. 1 is a drawing illustrating an exemplary sequence of sensor pulses 10 that may be transmitted by the sensor aperture.

Referring to FIG. 1, the sensor pulses 10 are transmitted by the sensor aperture during a scanning mode with the off period 20 interposed therebetween. The sensor pulse 10 may have a pulse width of 125 µs, and the off period 20 may have a width of 250 µs. However, the present invention is not limited thereto.

Figure 2:
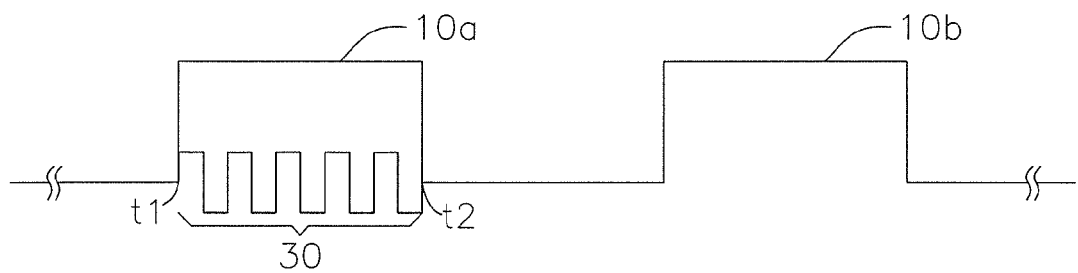
FIG. 2 is a drawing conceptually illustrating communication data being modulated onto one of the sensor pulses of FIG. 1.

FIG. 2 is a drawing conceptually illustrating communication data being modulated onto one of the sensor pulses 10 of FIG. 1.

Referring to FIG. 2, communication data 30 may be modulated onto a first sensor pulse 10a of two sensor pulses as a CDL waveform, and a second sensor pulse 10b is used for radar scanning. Accordingly, the same sensor aperture may be utilized for both data communication and radar sensing. However, when a pulse width of the sensor pulse 10a does not provide sufficient time for transmitting all the communication data, only a portion of the communication data can be transmitted during the period of a single sensor pulse, and other portions of the communication data may be transmitted in one or more subsequent sensor pulses. To that end, the communication data 30 may be modulated onto multiple sensor pulses as P-CDL waveforms. According to embodiments of the present invention, standard COTS/OTS modem (e.g., CDL modem) may be interfaced with the transmitter/receiver of the radar system to transmit/receive communication data in P-CDL waveforms, thereby potentially lowering system cost and reducing the need to source or design modem specifically to handle P-CDL waveforms. In the following description of exemplary embodiments of the present invention, techniques are described to transmit data in P-CDL waveforms, and to detect, receive and decode data transmitted in P-CDL waveforms by utilizing a standard COTS/OTS modem in an existing radar system.

Figure 3:
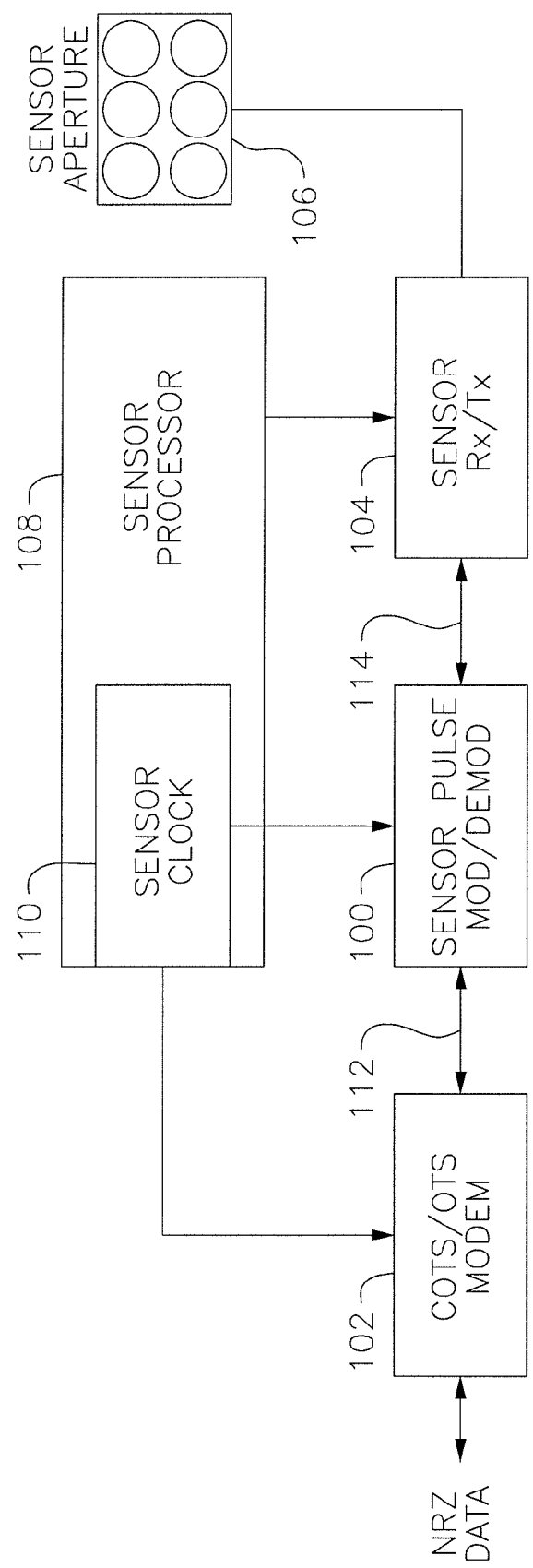
FIG. 3 is a block diagram conceptually illustrating a sensor and communication interface for interfacing a COTS/OTS modem with a sensor receiver/transmitter of a radar platform according to an embodiment of the present invention.

FIG. 3 is a block diagram conceptually illustrating a sensor and communication interface for interfacing a standard COTS/OTS modem (e.g., standard CDL modem) with a sensor receiver/transmitter of a radar platform.

Referring to FIG. 3, a sensor and communication interface 100 connects a COTS/OTS modem 102 to a sensor receiver/transmitter 104. A sensor aperture 106 (e.g., antenna) is connected to the sensor receiver/transmitter 104 for receiving/transmitting sensor pulses (or radar pulses). In one embodiment, the sensor receiver/transmitter 104 is an analog/driver circuitry that includes T/R switch, high power amplifier (HPA) and polarization switch. Furthermore, the radar platform may include a sensor processor 108 for managing the sensor receiver/transmitter 104. The processor 108 provides timing control signals/clock signal to the sensor receiver/transmitter 104. A sensor clock 110, which may be included in the sensor processor 108, provides a pulse timing of the sensor pulses to the sensor and communication interface 100. In the following description, the sensor and communication interface 100 may be referred to as sensor pulse modulator, sensor pulse demodulator, or sensor pulse modulator/demodulator in different embodiments of the present invention depending on the context.

To transmit communication data, non-return-to-zero (NRZ) data is inputted to the COTS/OTS modem 102 that modulates the NRZ data as a CDL waveform 112. Then, the sensor and communication interface 100 modulates the CDL waveform 112 onto sensor pulses as P-CDL waveforms 114 to be transmitted by the sensor receiver/transmitter 104 via the sensor aperture 106. The sensor and communication interface 100 also receives the pulse timing of the sensor pulses so that transmission of the P-CDL waveforms 114 can be synchronized with the transmission of the sensor pulses. For receiving communication data, sensor pulses modulated with P-CDL waveforms are received by the sensor receiver/transmitter 104 via the sensor aperture 106. Then, the received P-CDL waveforms are demodulated into a corresponding CDL waveform, which is further demodulated by the COTS/OTS modem 102 to its corresponding NRZ data. Exemplary embodiments of the sensor and communication interface 100 will be described in more detail below. While typical COTS/OTS modems have internal crystal clock, in FIG. 4, the sensor clock 110 is used as input to drive the COTS/OTS modem 102 (in lieu of the internal crystal oscillator of the modem) in order to obtain coherence clock synchronization.

Figure 4A:
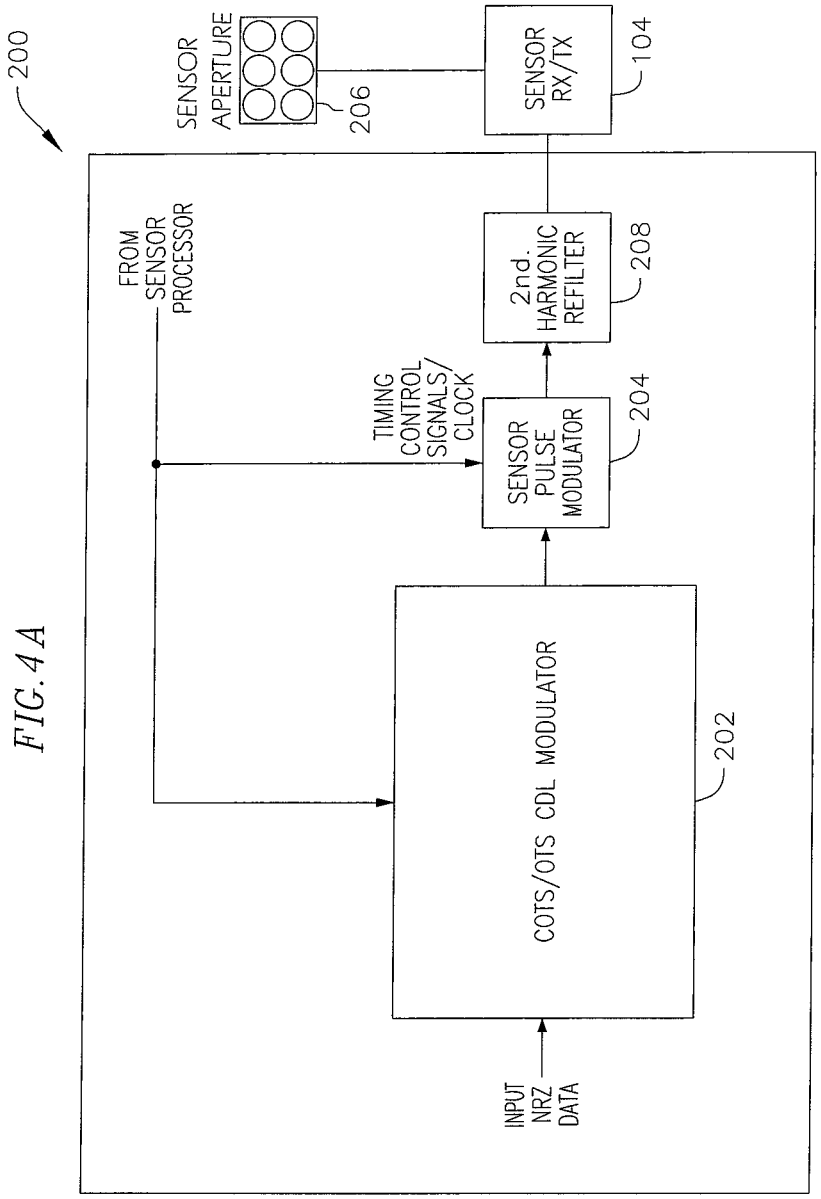
FIGS. 4A and 4B are drawings conceptually illustrating a P-CDL modulator according to an embodiment of the present invention.
Figure 4B:
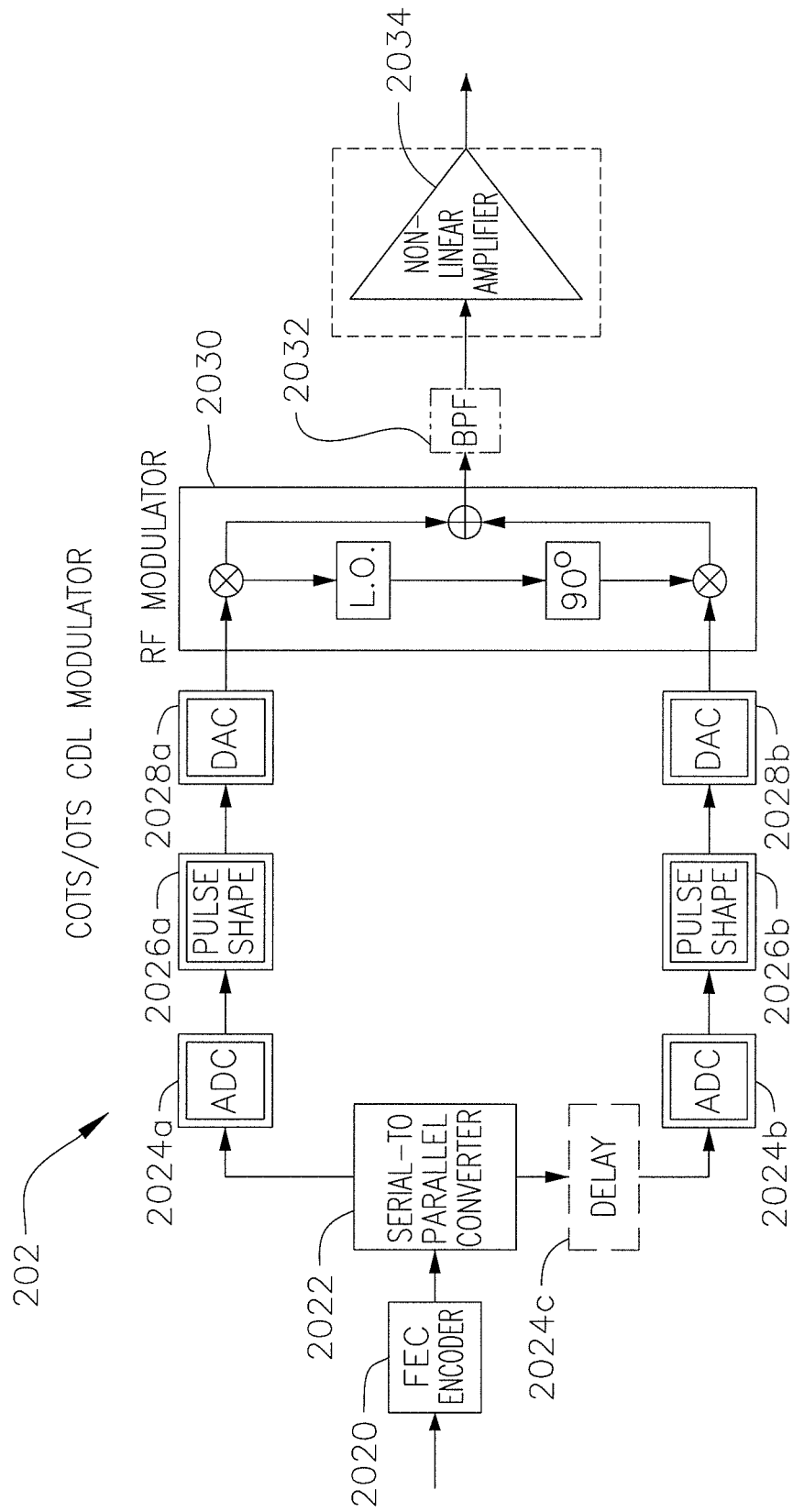

FIGS. 4A and 4B are drawings conceptually illustrating a P-CDL modulator (or P-CDL transmitter) according to an embodiment of the present invention.

Referring to FIG. 4A, a P-CDL modulator 200 (or P-CDL transmitter) includes a CDL modulator 202 (e.g., a standard COTS/OTS CDL modem), a sensor pulse modulator 204 for converting a CDL waveform outputted by the CDL modulator 202 into P-CDL waveforms that are received by the sensor receiver/transmitter 104 and transmitted by the sensor aperture 206. The CDL modulator 202 can be any suitable CDL modulator known in the art. FIG. 4B illustrates the CDL modulator 202 in more detail according to an embodiment of the present invention. In FIG. 4B, the CDL modulator 202 includes a forward error correction (FEC) encoder 2020 for receiving the NRZ data, a serial-to-parallel converter 2022 for converting the output of the FEC encoder 2020 to parallel data. A first output of the serial-to-parallel converter 2022 is processed by a first ADC 2024a, a first pulse shape unit 2026a, and a first DAC 2028a in the stated order before being received by an RF modulator 2030. In addition, a second output of the serial-to-parallel converter 2022 is delayed by a delay unit 2023 and processed by a second ADC 2024b, a second pulse shape unit 2026b, and a second DAC 2028b in the stated order before being received by the RF modulator 2030. The output of the RF modulator 2030 is filtered by a suitable bandpass filter (BPF) 2032 (e.g., a tunable BPF) and is amplified by a suitable linear amplifier 2034. In addition, the P-CDL modulator 200 may include a $2^{nd}$ harmonic RF filter 208 (FIG. 4A) connected between the sensor pulse modulator 204 and the sensor aperture 206. The $2^{nd}$ harmonic RF filter 208 removes higher order harmonic frequencies. Here, the sensor pulse modulator 204 may be a switch that is controlled in accordance with the timing of the sensor pulses such that the switch may be turned on during the time when a sensor pulse is transmitted to modulate the CDL waveform outputted by the CDL modulator 202 onto the sensor pulse. When the switch is turned off, the CDL waveform outputted by the CDL modulator 202 is not modulated onto the sensor pulse to be transmitted by the sensor aperture 206. One skilled in the art would understand that a suitable circuit (e.g., a buffer) may be connected between the CDL modulator 202 and the sensor pulse modulator 204 so that when the sensor pulse modulator 204 is turned off, the standard CDL waveform outputted from the CDL modulator 202 may be buffered or delayed for later transmission when the sensor pulse modulator 204 is turned on again. Alternatively, the operation of the CDL modulator 202 may be suspended when the sensor pulse modulator 204 is turned off. While an exemplary circuit of the CDL modulator 202 is illustrated in FIG. 4B, the present invention is not limited to the particular CDL modulator 202 of FIG. 4B. To the contrary, other suitable standard COTS/OTS CDL modulators may be used.

Figure 5A:
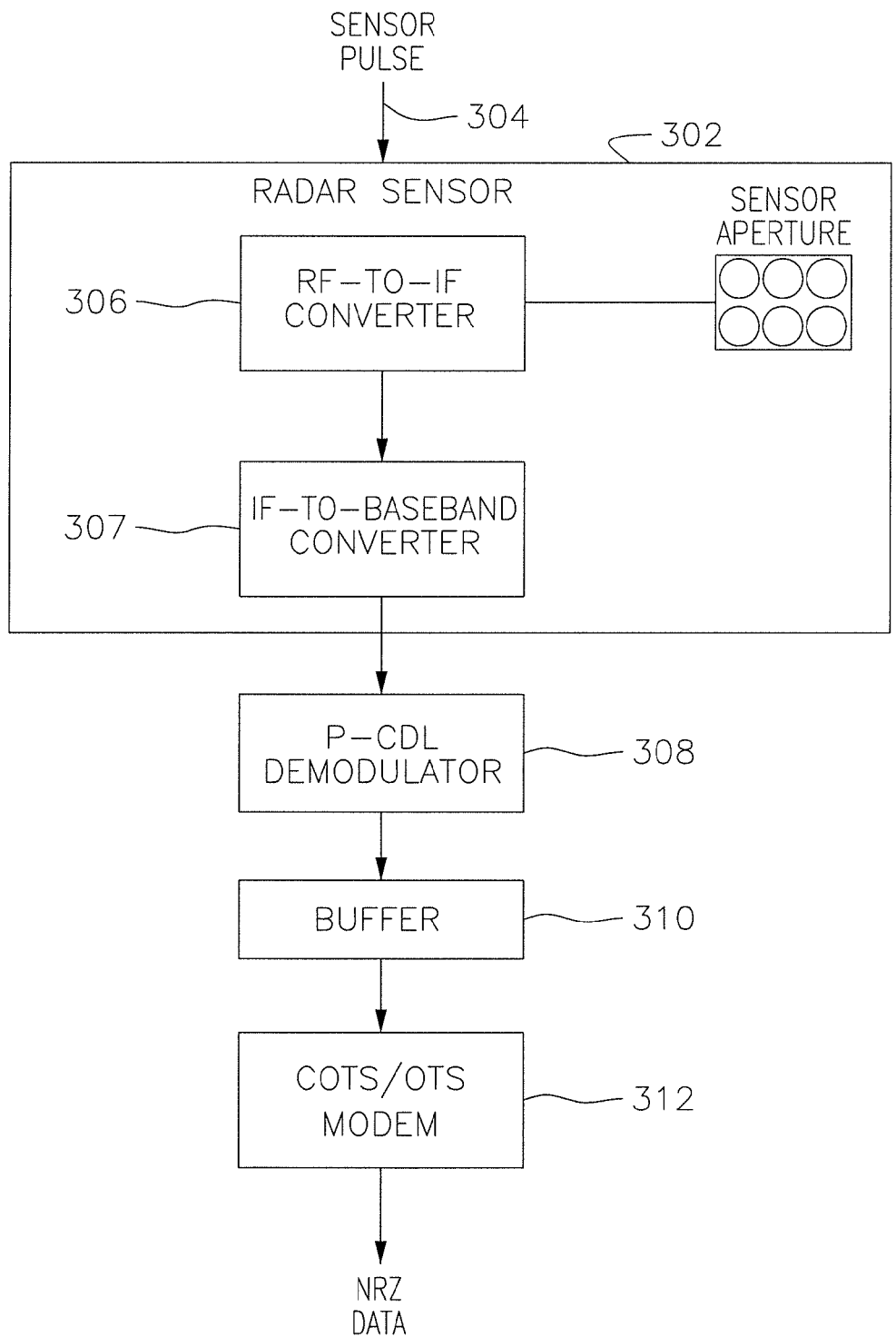

FIGS. 5A and 5B are drawings conceptually illustrating a P-CDL demodulator according to an embodiment of the present invention.

Figure 6:
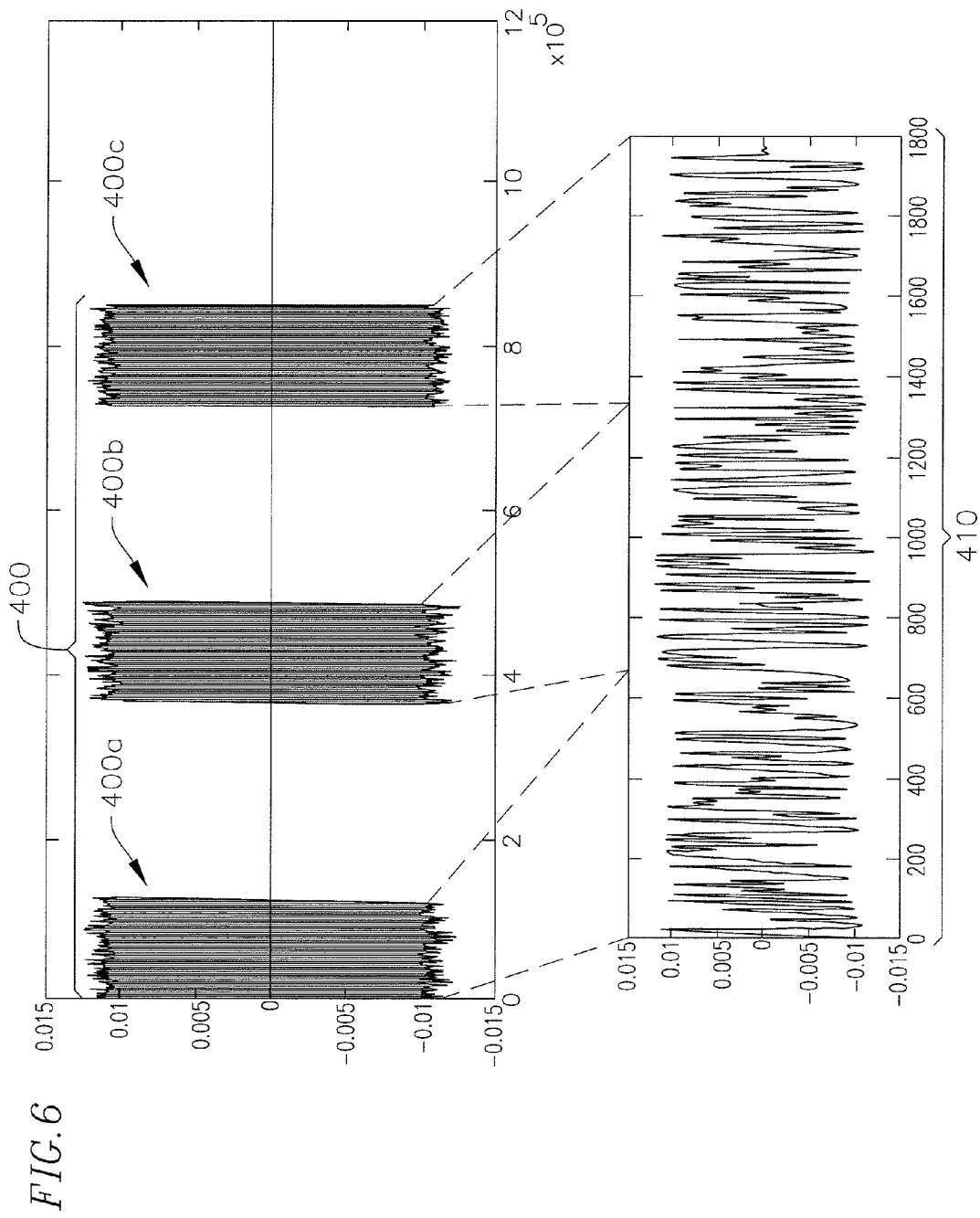
FIG. 6 is a drawing illustrating exemplary P-CDL waveforms and a CDL waveform.

Referring to FIG. 5A, a radar sensor 302 is configured to receive sensor pulses 304 that are modulated with P-CDL waveforms. FIG. 6 is a drawing conceptually illustrating exemplary P-CDL waveforms 400 and a CDL waveform 410.

Here, the separate P-CDL waveforms 400 are demodulated and recombined by a P-CDL demodulator 308 to regenerate the CDL waveform 410. The radar sensor 302 may include an RF-to-IF converter 306 to convert the received sensor pulses 304 to an IF received signal with lower frequency. In addition, the radar sensor 302 may include an IF-to-Baseband converter 307 to convert the IF received signal to a baseband signal. For example, the frequency of the RF signal can be 10 GHz, the frequency of the IF signal can be 300 MHz or higher. However, the present invention is not limited thereto. The P-CDL demodulator 308 together with a buffer 310 demodulates the P-CDL waveforms 400 (i.e., the baseband signal) into the CDL waveform 410. In FIG. 6, the P-CDL waveforms are modulated onto three sensor pulses (400a, 400b, 400c). After the P-CDL demodulator 308 recovers the data modulated onto the three sensor pulses (400a, 400b, 400c), the data are combined in the buffer 310 into the corresponding CDL waveform 410 that can be demodulated by a COTS/OTS modem 312 (e.g., a plug-and-play COTS/OTS CDL modem). FIG. 5B is a block diagram of the COTS/OTS modem 312 according to an embodiment of the present invention. The COTS/OTS modem 312 includes a QPSK carrier loop 312a, a data detector 312b, a timing recovery loop 312c, and a decoder 312d. The COTS/OTS modem 312 can perform carrier tracking, timing synchronization and data decoding for a typical CDL modem. However, one skilled in the art will understand that the present invention is not limited to the particular structure of the COTS/OTS modem 312 shown in FIG. 5B, but, to the contrary, other suitable modems known in the art may be used. Exemplary embodiments of the P-CDL demodulator 308 will be described in more detail below.

Figure 7:
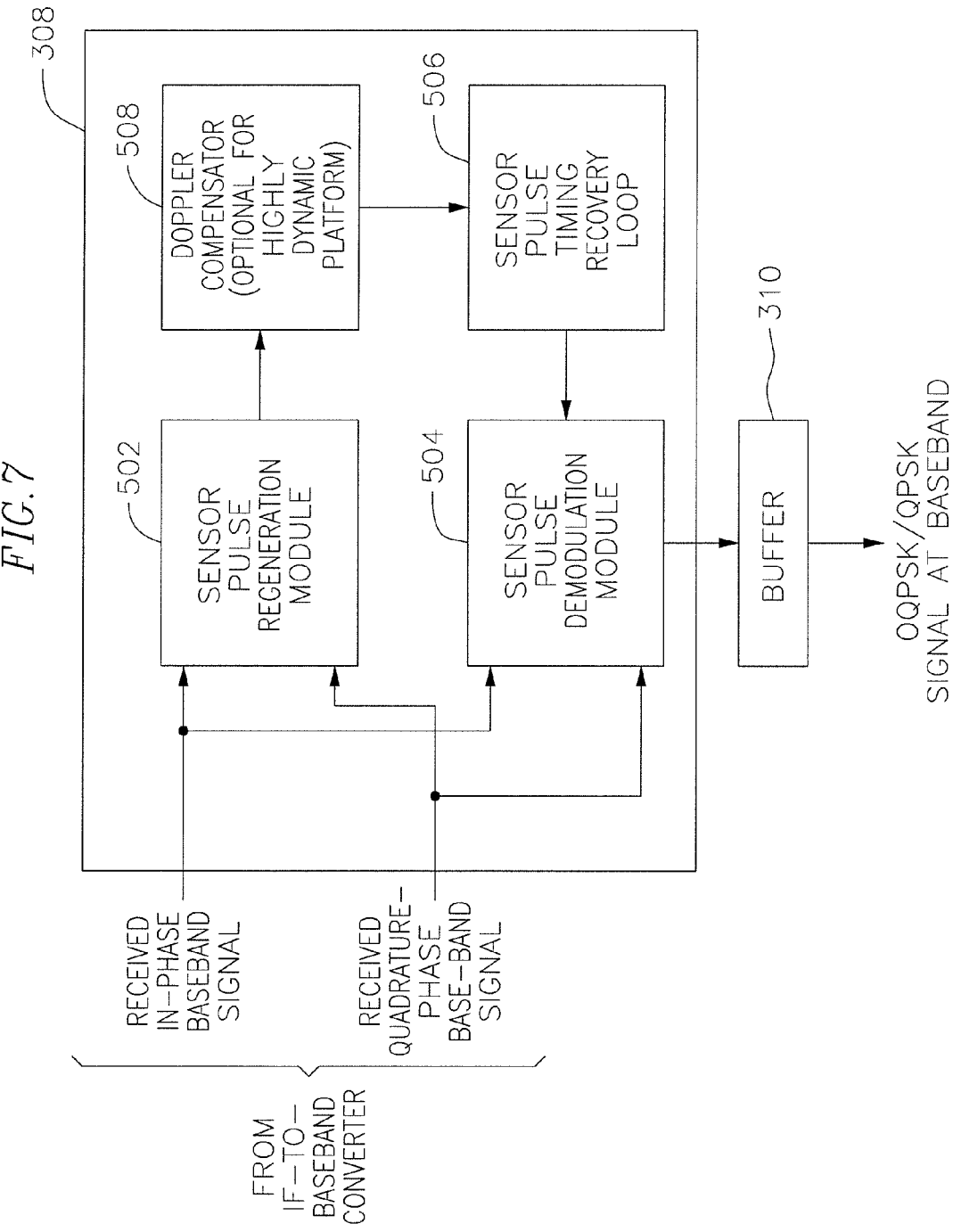
FIG. 7 is a block diagram conceptually illustrating an exemplary embodiment of a P-CDL demodulator.

FIG. 7 is a block diagram conceptually illustrating an embodiment of the P-CDL demodulator 308.

Referring to FIG. 7, the P-CDL demodulator 308 includes a sensor pulse regeneration module 502, a sensor pulse demodulation module 504, and a sensor pulse timing recovery loop 506. Optionally, the P-CDL demodulator 308 may include a Doppler compensator 508 for compensating the Doppler effect of highly dynamic platforms. The sensor pulse regeneration module 502 receives an in-phase baseband signal and a quadrature-phase baseband signal from the IF-to-Baseband converter 307. The sensor pulse regeneration module 502 generates a signal with zero-crossing timing corresponding to the timing of the sensor pulses. For example, a time period between two zero-crossings is equal to a pulse wide of a corresponding sensor pulse. Referring back to FIG. 2, the start time and stop time of the sensor pulse 10 are denoted by t1 and t2, respectively. Therefore, the pulse width of the sensor pulse 10 is equal to t2−t1. After the signal with zero-crossing timing corresponding to the timing of the sensor pulses is generated by the sensor pulse regeneration module 502, Doppler compensation may be performed by the Doppler compensator 508 for highly dynamic platform. Then, the sensor pulse timing recovery loop 506 receives the signal with zero-crossing timing from the sensor pulse regeneration module 502 and regenerates the timing of the sensor pulses such that the start time and stop time of each of sensor pulses modulated with data may be determined. The sensor pulse timing recovery loop 506 may be any suitable digital data transition loop known in the art to track the zero-crossings of the signal outputted from the sensor pulse regeneration module 502.

Figure 8:
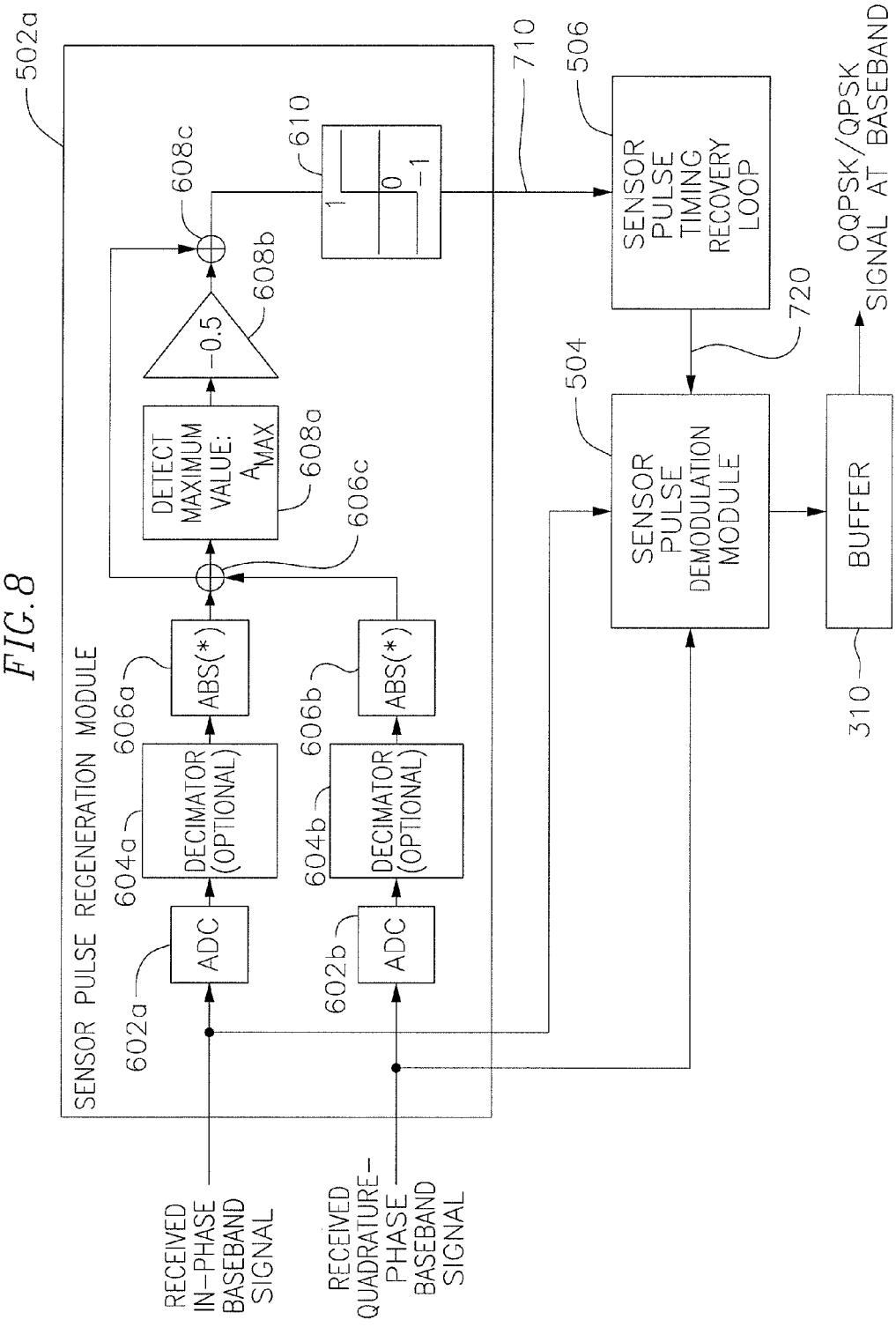
FIG. 8 is a drawing conceptually illustrating a sensor pulse regeneration module according to one embodiment of the present invention.

FIG. 8 is a drawing conceptually illustrating a first embodiment of the sensor pulse regeneration module 502 according to the present invention.

Referring to FIG. 8, a sensor pulse regeneration module 502a receives an in-phase baseband signal and a quadrature-phase baseband signal. The sensor pulse regeneration module 502a includes a first analog-to-digital converter (ADC) 602a for digitizing the in-phase baseband signal and a second analog-to-digital converter (ADC) 602b for digitizing the quadrature-phase baseband signal. Optionally, a first decimator 604a and a second decimator 604b may perform decimation on the digitized in-phase and quadrature-phase baseband signals, respectively, to downconvert the signals to lower sampling frequency. Function blocks 606a and 606b respectively convert the digitized in-phase and quadrature-phase baseband signals to their absolute values. Here, the output of the function block 606b is offset from the output of the function block 606a by one half of a P-CDL data symbol. The outputs of the function blocks 606a and 606b are summed by an adder 606c, and the output of the adder 606c is processed by a maximum value detection unit 608a and an amplitude scaler 608b in the stated order. In addition, the sum of the outputs of the function blocks 606a and 606b is added to the output of the amplitude scaler 608b by an adder 608c. The output of the adder 608c recovers the radar pulse of the received P-CDL signal. A hard limiter 610 converts the recovered radar pulse to NRZ data, which has a symbol timing corresponding to the radar pulse timing. Hereinafter the NRZ data is referred to as the pulse timing signal 710.

Figure 9:
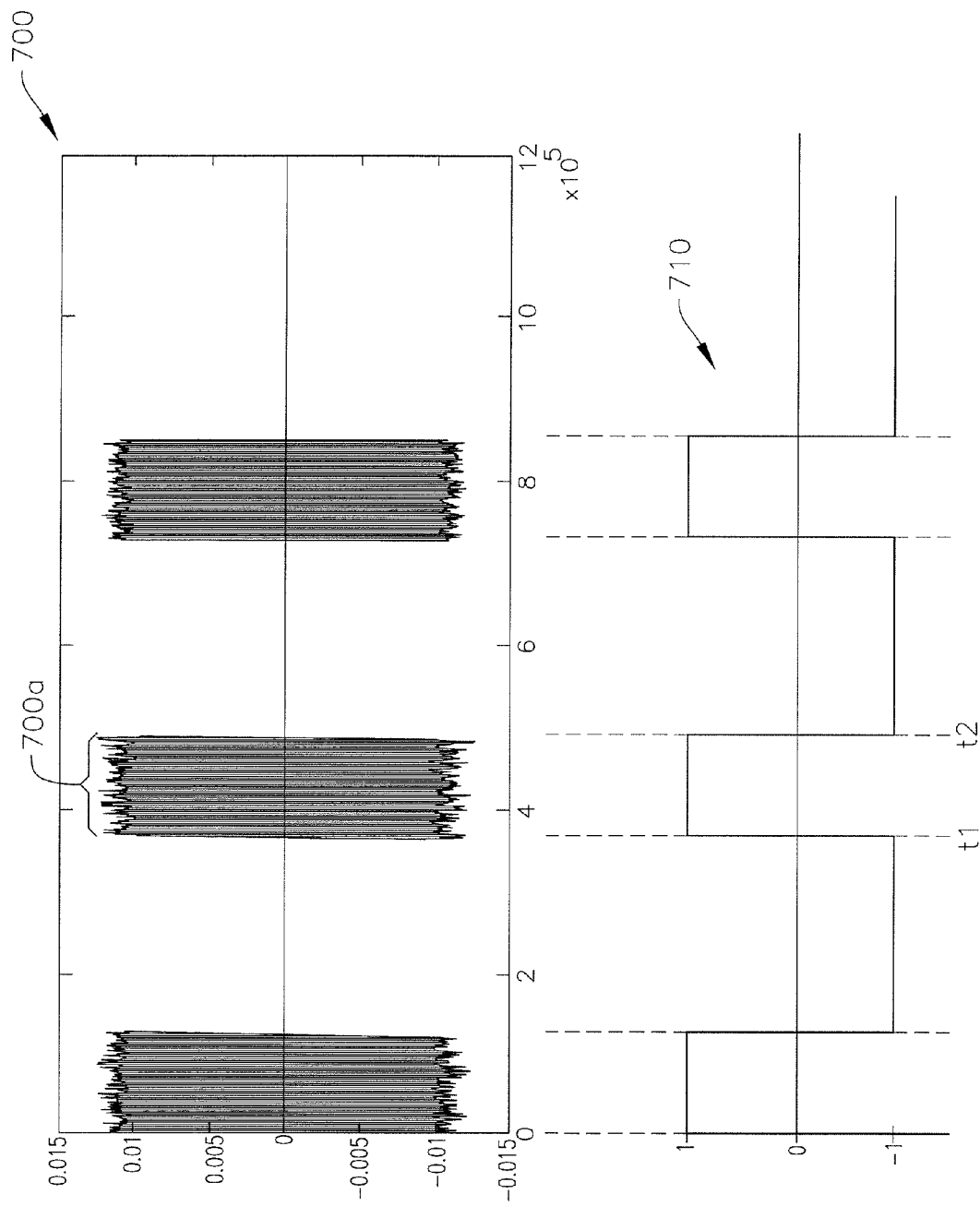
FIG. 9 is a drawing illustrating exemplary P-CDL waveforms and a corresponding pulse signal generated by the pulse regeneration module of FIG. 8.

According to the above described operations, The pulse regeneration module 502a generates the pulse timing signal 710 with a timing corresponding to the radar pulse timing of the P-CDL waveforms. FIG. 9 is a drawing illustrating exemplary P-CDL waveforms 700 and a corresponding pulse timing signal 710 generated by the pulse regeneration module 502a. As shown in FIG. 9, when a P-CDL waveform 700a is modulated onto a sensor pulse, the pulse timing signal 710 has a first value (e.g., +1), and when a P-CDL waveform is not detected, the pulse signal 710 has a second value (e.g., −1). Here, a pulse width of the pulse timing signal 710 is equal to t2−t1, and it is equal to the duration of the P-CDL waveform 700a. Referring back to FIG. 8, the pulse timing signal 710 is processed by a suitable sensor pulse timing recovery loop 506 to provide a tracking signal 720 to track the radar pulse timings (e.g., on/off timing) of the P-CDL waveforms 700. The sensor pulse demodulation module 504 demodulates the in-phase and quadrature-phase baseband signals in synchronization with the tracking signal 720 to generate a plurality of separate CDL waveforms Subsequently, the CDL waveforms outputted from the sensor pulse demodulation module 504 are recombined in the buffer 310 to generate a standard CDL waveform (e.g., CDL waveform 410 shown in FIG. 6) that may be demodulated by a standard COTS/OTS CDL modem.

Figure 10:
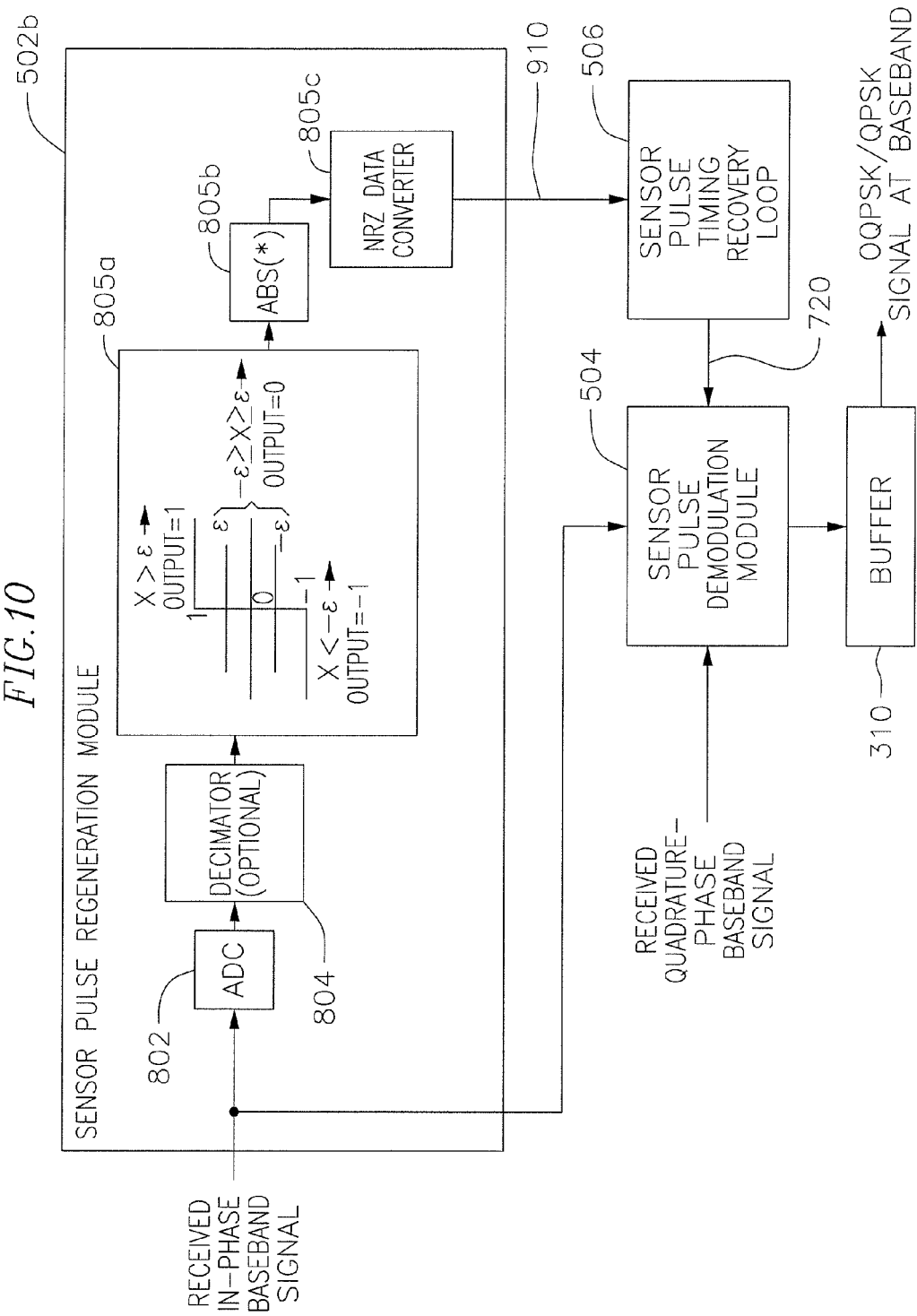
FIG. 10 is a drawing conceptually illustrating a sensor pulse regeneration module according to another embodiment of the present invention.

FIG. 10 is a drawing conceptually illustrating another embodiment of the sensor pulse regeneration module 502 according to the present invention.

Referring to FIG. 10, a sensor pulse regeneration module 502b receives an in-phase baseband signal. The in-phase baseband signal may be digitized by an analog-to-digital converter (ADC) 802 included in the sensor pulse regeneration module 502b. Alternatively, the in-phase baseband signal may be digitized by a suitable ADC (not shown) that is external to the sensor pulse regeneration module 502b. Optionally, a decimator 804 may perform decimation on the digitized in-phase baseband signal. A function block 805a removes the zero crossings from the digitized in-phase baseband signal caused by modulation and noise. Here, X in the block 805a refers to the value of the signal, and the value of $\epsilon$ is selected to account for the noise level of the signal. The output of the function block 805a is converted to its absolute value at a function block 805b to recover the radar pulse from the signal.

The recovered radar pulse signal is then converted to NRZ data by a NRZ data converter 805c. Hereinafter, the NRZ data output from the NRZ data converter 805c is referred to as a pulse timing signal 910.

Figure 11:
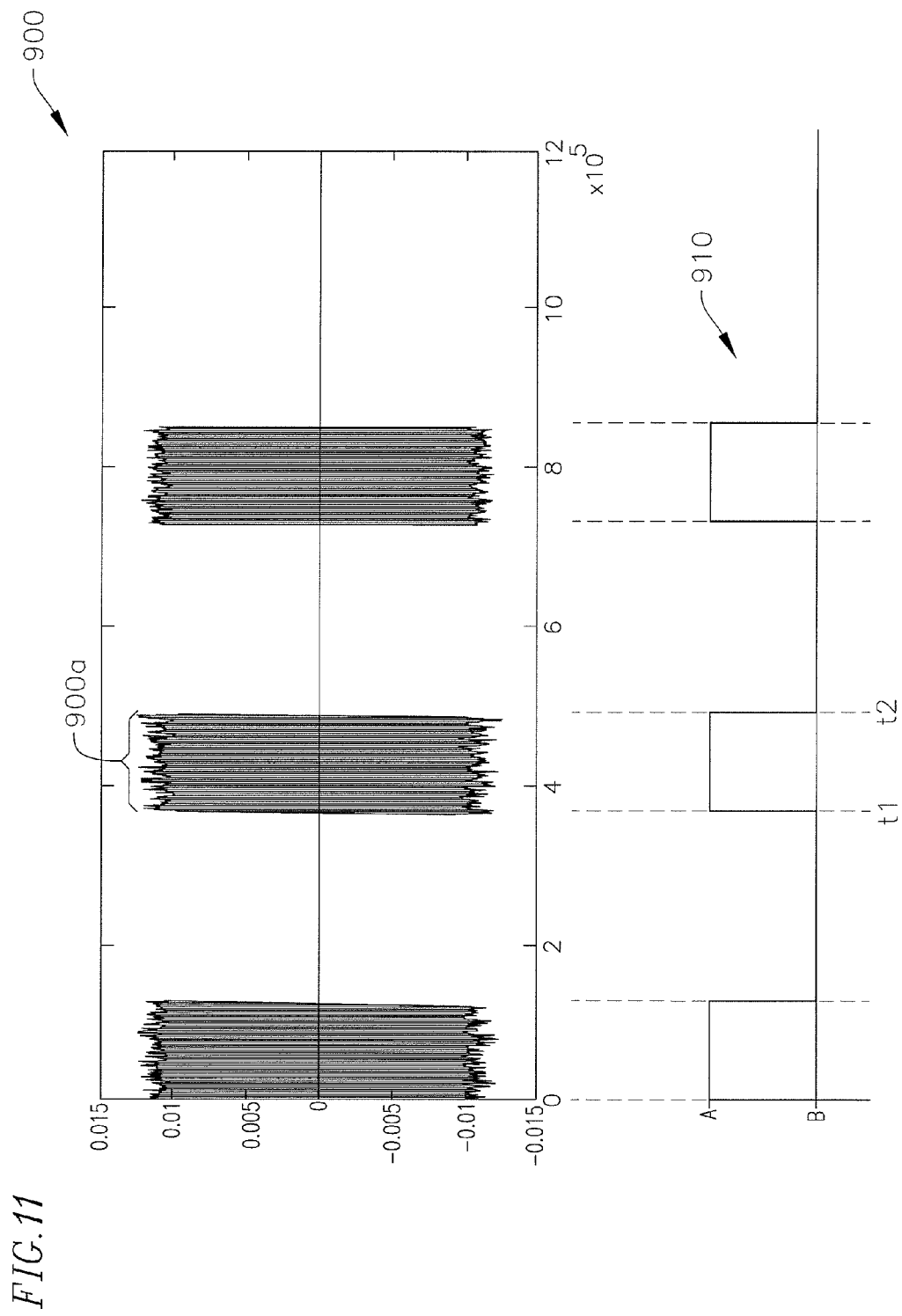
FIG. 11 is a drawing illustrating exemplary P-CDL waveforms and a corresponding pulse signal generated by the pulse regeneration module of FIG. 10.

According to the above described operations, the sensor pulse regeneration module 502b generates the pulse timing signal 910 with a timing corresponding to the radar pulse of the P-CDL waveforms. FIG. 11 is a drawing conceptually illustrating exemplary P-CDL waveforms 900 and a corresponding pulse timing signal 910 generated by the pulse regeneration module 502b. As shown in FIG. 11, when a P-CDL waveform 900a is modulated onto a sensor pulse having a duration from t1 to t2, the pulse timing signal 910 has a first value A during a period from t1 to t2, and when a P-CDL waveform is absence, the pulse timing signal 910 has a second value B that is different from the first value A. Therefore, a time difference between t1 and t2 is equal to the pulse width of the sensor pulse modulated with the P-CDL waveform 900a. Referring back to FIG. 10, the pulse timing signal 910 is processed by the sensor pulse timing recovery loop 506 to provide a tracking signal 720 to track the timings (e.g., on/off timing) of the P-CDL waveforms 900. The sensor pulse demodulation module 504 demodulates the in-phase and quadrature-phase baseband signals in synchronization with the tracking signal 720 to generate a plurality of separate CDL waveforms each corresponding to one of the P-CDL waveforms 900. Subsequently, the separate CDL waveforms outputted from the sensor pulse demodulation module 504 are recombined in the buffer 310 to generate a standard CDL waveform (e.g., CDL waveform 410 shown in FIG. 6) that may be demodulated by a standard COTS/OTS CDL modem.

According to the above described exemplary embodiments of the present invention, standard COTS/OTS CDL modems may be utilized to demodulate/modulate P-CDL signal waveforms with existing radar aperture for data communication. This COTS/OTS approach provides the sensor/communication designer with a wide range of COTS/OTS modem choices that meet design and cost requirements for an application. Therefore, system cost may be reduced because custom design of CDL modem may be avoided. Furthermore, data throughput may be increased because P-CDL communication pulses are detected and tracked without the overhead of transmitting non-data carrying bit sequences such as preamble and/or postamble to encapsulate the data payload.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims and their equivalents.

What is claimed is:

1. An apparatus for interfacing a modem to pulsed data communication, the apparatus comprising:
   a demodulator for receiving a sequence of first pulse signals, at least one first pulse signal of the sequence of first pulse signals being modulated with an input signal, wherein the demodulator comprises:
      a pulse regeneration module for recovering a pulse timing of the sequence of first pulse signals; and
      a pulse demodulation module for demodulating the sequence of first pulse signals to recover the input signal in synchronization with the pulse timing of the sequence of first pulse signals,
   wherein the input signal is modulated onto the at least one first pulse signal by phase-shift keying utilizing at least two phase components comprising a first phase component and a second phase component, and
   wherein the pulse regeneration module is adapted to generate the pulse timing of the sequence of first pulse signals in accordance with a summation of an absolute value of the first phase component and an absolute value of the second phase component.

2. The apparatus of claim 1, further comprising a pulse modulator for receiving an output signal from the modem, wherein the pulse modulator comprises an on-off switch for modulating the output signal onto at least one second pulse signal of a sequence of second pulse signals in accordance with a pulse timing of the sequence of second pulse signals.

3. The apparatus of claim 1,
   wherein the pulse regeneration module comprises a hard limiter for generating a hard-limit signal having a first value or a second value in accordance with the following conditions:
      X>a reference value, the hard-limit signal is equal to the first value; and
      X≤the reference value, the hard-limit signal is equal to the second value,
      where X is a value corresponding to the summation of the absolute value of the first phase component and the absolute value of the second phase component, and the first value is larger than the second value, and
   wherein a time duration when the hard-limit signal is equal to the first value corresponds to the pulse timing of the sequence of first pulse signals.

4. The apparatus of claim 1, wherein the pulse regeneration module comprises:
   a hard limiter for generating a hard-limit signal having a first value, a second value, or a third value in accordance with the following conditions:
      X>ϵ, the hard-limit signal is equal to the first value; and
      −ϵ≤X≤ϵ, the hard-limit signal is equal to the second value;
      X<−ϵ, the hard-limit signal is equal to the third value,
      where X is a value of the at least one first pulse signal, ϵ is a threshold value, the first value is larger than the third value, and the second value is between the first value and the third value;
   an absolute value function block for receiving the hard limit signal and generating from it an output signal, in accordance with the following conditions:
      the output signal being equal to the hard limit signal when the hard limit signal is equal to the first value or equal to the second value; and
      the output signal being equal to the negative of the hard limit signal when the hard limit signal is equal to the third value; and
   a non-return-to-zero (NRZ) converter for converting the output signal from the absolute value function block to an NRZ data signal, wherein a time duration between two zero-crossings of the non-return-to-zero data signal corresponds to the pulse timing of the sequence of first pulse signals.

5. An apparatus for interfacing a modem to pulsed data communication, the apparatus comprising:
   a demodulator for receiving a sequence of first pulse signals, at least one first pulse signal of the sequence of first pulse signals being modulated with an input signal, wherein the demodulator comprises:
      a pulse regeneration module for recovering a pulse timing of the sequence of first pulse signals; and
      a pulse demodulation module for demodulating the sequence of first pulse signals to recover the input signal in synchronization with the pulse timing of the sequence of first pulse signals, the apparatus further comprising a compensator for compensating the Doppler effect of the sequence of first pulse signals.

6. The apparatus of claim 1, wherein the demodulator is adapted to demodulate at least two first pulse signals of the sequence of first pulse signals into a first portion and a second portion of the input signal, respectively, and the apparatus further comprises a buffer for combining the first portion and the second portion as the input signal.

7. A method for demodulating pulsed data communication signals, the method comprising:

receiving a sequence of first pulse signals, at least one first pulse signal of the sequence of first pulse signals being modulated with an input signal;

recovering a pulse timing of the sequence of first pulse signals; and demodulating the sequence of first pulse signals to recover the input signal in synchronization with the pulse timing of the sequence of first pulse signals, wherein the input signal is modulated onto the at least one first pulse signal by phase-shift keying utilizing at least two phase components comprising a first phase component and a second phase component, and wherein the method further comprises:

generating the pulse timing of the sequence of first pulse signals in accordance with a summation of an absolute value of the first phase component and an absolute value of the second phase component.

8. The method of claim 7, further comprising:

receiving an output signal from a modem; and modulating the output signal onto at least one second pulse signal of a sequence of second pulse signals by operating an on-off switch in accordance with a pulse timing of the sequence of second pulse signals.

9. The method of claim 7, further comprising:

generating a hard-limit signal having a first value and a second value in accordance with the following conditions:

X>a reference value, the hard-limit signal is equal to the first value;

X≤the reference value, the hard-limit signal is equal to the second value, where X is a value corresponding to the summation of the absolute value of the first phase component and the absolute value of the second phase component, and the first value is larger than the second value, wherein a time duration when the hard-limit signal is equal to the first value corresponds to the pulse timing of the sequence of first pulse signals.

10. The method of claim 7, further comprising:

generating a hard-limit signal having a first value, a second value, or a third value in accordance with the following conditions:

X>ϵ, the hard-limit signal is equal to the first value;

−ϵ≤X≤ϵ, the hard-limit signal is equal to the second value;

X<−ϵ, the hard-limit signal is equal to the third value, where X is a value of the at least one first pulse signal, ϵ is a threshold value, the first value is larger than the third value, and the second value is between the first value and the third value;

generating an absolute value signal from the hard limit signal, in accordance with the following conditions:

the absolute value signal being equal to the hard limit signal when the hard limit signal is equal to the first value or equal to the second value; and the absolute value signal being equal to the negative of the hard limit signal when the hard limit signal is equal to the third value; and converting a signal derived from the absolute value signal to an NRZ data signal, wherein a time duration between two zero-crossings of the non-return-to-zero data signal corresponds to the pulse timing of the sequence of first pulse signals.

11. The method of claim 7, further comprising compensating the Doppler effect on the sequence of first pulse signals.

12. The method of claim 7, further comprising:

demodulating at least two first pulse signals of the sequence of first pulse signals into a first portion and a second portion of the input signal, respectively, and combining the first portion and the second portion as the input signal.

* * * * *